United States Patent [19]

Milton

[11] 4,266,886
[45] May 12, 1981

[54] METHOD AND DEVICE FOR CONNECTING A FLOATING INSTALLATION TO AN UNDERWATER INSTALLATION THROUGH AT LEAST ONE FLEXIBLE LINE

[75] Inventor: Alan Milton, Boulogne sur Seine, France

[73] Assignee: Institut Francais du Petrole, Rueil-Malmaison, France

[21] Appl. No.: 941,097

[22] Filed: Sep. 8, 1978

[30] Foreign Application Priority Data

Sep. 8, 1977 [FR] France .................................. 77 27169

[51] Int. Cl.³ .............................................. F16L 1/04
[52] U.S. Cl. ..................................... 405/169; 166/367
[58] Field of Search ....................... 405/169, 170, 195; 166/350, 359, 367; 175/5–8; 114/264, 265

[56] References Cited

U.S. PATENT DOCUMENTS

| | | | |
|---|---|---|---|
| 2,929,610 | 3/1960 | Stratton | 175/7 X |
| 3,199,553 | 8/1965 | Garrett et al. | 405/169 X |
| 3,204,708 | 9/1965 | Berne | 175/6 |
| 3,426,842 | 2/1969 | Corley et al. | 166/359 X |
| 3,517,520 | 6/1970 | Hammett | 405/169 |
| 3,538,238 | 11/1970 | Delacour et al. | 166/359 X |
| 3,592,014 | 7/1971 | Brown | 405/169 |
| 3,724,061 | 4/1973 | Schipper | 405/169 |

*Primary Examiner*—Dennis L. Taylor
*Attorney, Agent, or Firm*—Millen & White

[57] ABSTRACT

A system for offshore oil production, comprising at least one underwater installation to which is connected at least one flow line which is releasably connected to a flexible riser suspended from a surface installation. The system comprises a stationary guide structure on the water bottom provided at its upper end with support means for the lower end of the flexible riser. The flexible riser forms by gravity a free loop portion above the water bottom, in the vicinity of the guide structure.

18 Claims, 8 Drawing Figures

METHOD AND DEVICE FOR CONNECTING A FLOATING INSTALLATION TO AN UNDERWATER INSTALLATION THROUGH AT LEAST ONE FLEXIBLE LINE

The present invention relates to a method and device for connecting a floating installation to an underwater installation, through at least one flexible pipe.

More particularly, but not exclusively, the invention may be used for conveying a fluid through a flexible pipe from an underwater installation, such as an underwater oil production wellhead, or a manifold in an oil field, or also a tank located on the underwater bottom . . . etc . . . , to a floating surface installation, such as a production platform, a loading buoy or terminal for oil tankers, a floating tank . . . etc . . . .

The use of flexible pipes in such applications presents over a partly rigid connection, the advantage of allowing larger displacements of the floating installation.

Suitable flexible pipes may comprise a flexible and tight tubular element withstanding the conveyed fluids, and reinforcing armourings capable of withstanding the pressure difference between the inside and outside of the pipe, and the traction forces applied thereto.

A problem to be solved is to provide between the underwater installation and the floating installation a connection whereby the rising portion of the flexible pipe, or "riser", which is suspended from the floating installation, is not liable to be subjected to a too rapid wear at its lower part by rubbing on the water bottom, and by compression resulting from downward movements of the floating installation due to the heave.

It has already been proposed to support this part of the pipe by an underwater caisson of positive buoyancy. This technique, which is applied when the movements of the floating installation are very substantial, requires however the use of very heavy and bulky caissons and it does not allow an easy change of the riser.

This drawback is obviated according to the present invention which provides a technique making use of a stationary support member for the flexible riser above the water bottom, and facilitating the installation and change of such riser.

Figure 1:
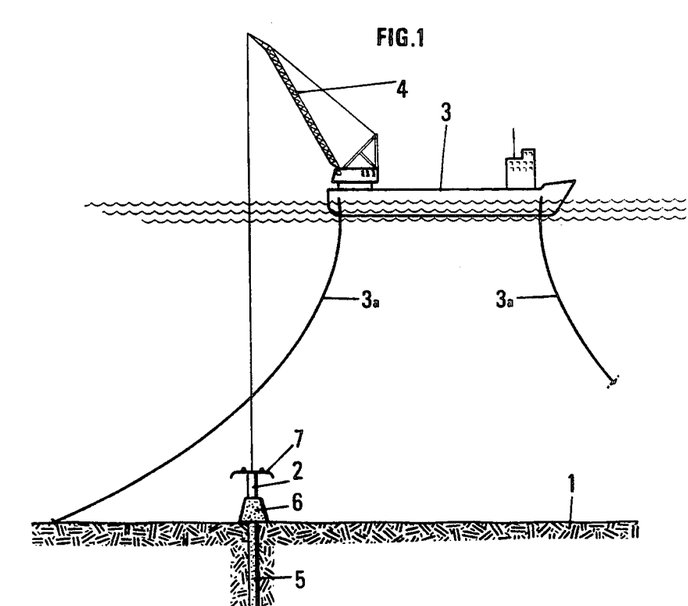
FIGS. 1 to 6 illustrate the successive steps of the method according to the invention for connecting a semi-submersible oil production platform to an underwater installation remote from the platform.

An embodiment of the invention will be described hereinunder by reference to the accompanying drawings wherein:

FIG. 1 illustrates the first step of the method according to the invention for laying a flexible pipe between a production platform and one or several producing oil wells located at some distance from the platform.

During this first step an upwardly elongated rigid guide-structure 2 of a height smaller than the water depth is laid onto the water bottom in a stationary position.

This structure may be positioned onto the bottom by using a crane 4 supported by a ship 3 which may, for example, be held in position by means of anchors and mooring line 3a. Structure 2 may be provided at its lower part with at least one pile or anchoring stake 5 which may be driven into the water bottom by using any suitable method (by conventional vibro-driving, for example), but it would obviously may also be possible to provide this guide structure with a base of sufficient area and weight to firmly rest on the water bottom without being secured thereto.

Structure 2 comprises at its upper part a table or template 7 adapted to locally support the flexible pipe or pipes to be laid, while limiting the curvature thereof at a value which prevents any damage of this pipe.

The curvature is limited at such value by providing a template of which at least a part (and preferably two opposing edges thereof) has a curved shape with a radius of curvature at least equal to the minimum radius of curvature of the flexible pipe or pipes. It will be obvious to those skilled in the art that the desired radius of curvature cannot be defined quantitatively for all flexible pipes and that such radius will be different for pipes made of different materials. Thus, the more rigid the material used in construction of the pipe, the larger the minimum radius of curvature, and the more flexible the material, the smaller the minimum radius of curvature required to prevent damage to the pipe.

In the selected non-limitative embodiment, the surface installation to which at least one flexible pipe is to be secured is an oil production platform 8 of the semi-submersible type.

Figure 2:
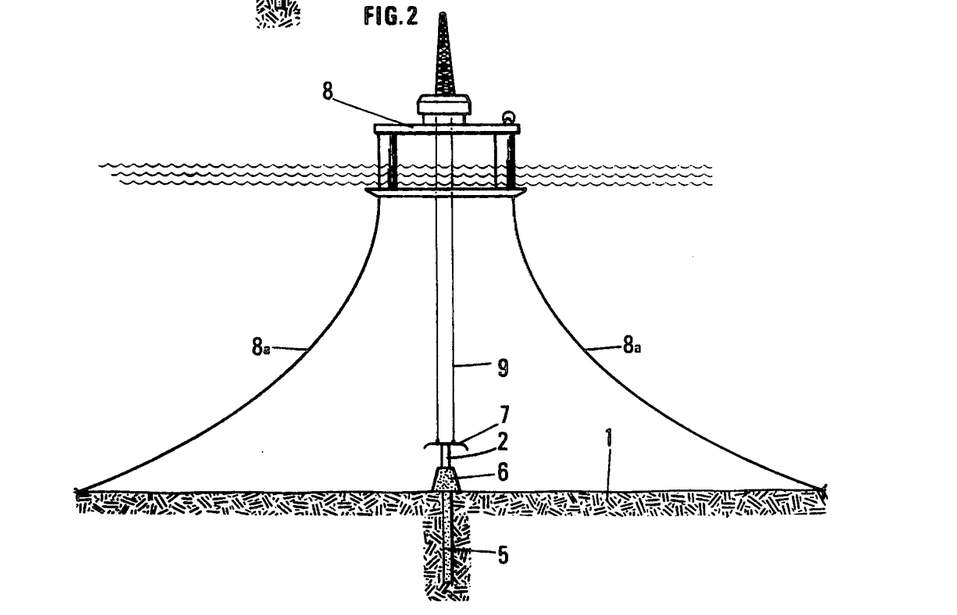

During the step of the method according to the invention which is illustrated by FIG. 2, platform 8 is positioned above the guide-structure 2 for example by means of mooring lines 8a, and a connection is provided through guide cables 9 between platform 8 and guide structure 2, according to a technique which is conventional in offshore drilling operations.

These guide-cables may be used for positioning template 7 at the top of guide structure 2, unless this template has already been placed there during the step illustrated by FIG. 1.

Thereafter at least one handling cable 10 is run from the laying barge 11, to which this cable is secured at 10a (FIG. 3), onto platform 8 and this cable is engaged into an element 7a slidably mounted for downward displacement along guide cables 9, the other end 10b of handling cable 10 being reeled on a winch carried by platform 8.

Then element 7a is lowered (FIG. 3) from platform 8 along guide cables 9, this element 7a being adapted to engage template 7 and guide at least one handling cable 10 (such handling cable running below element 7a in the illustrated embodiment).

Figure 3:
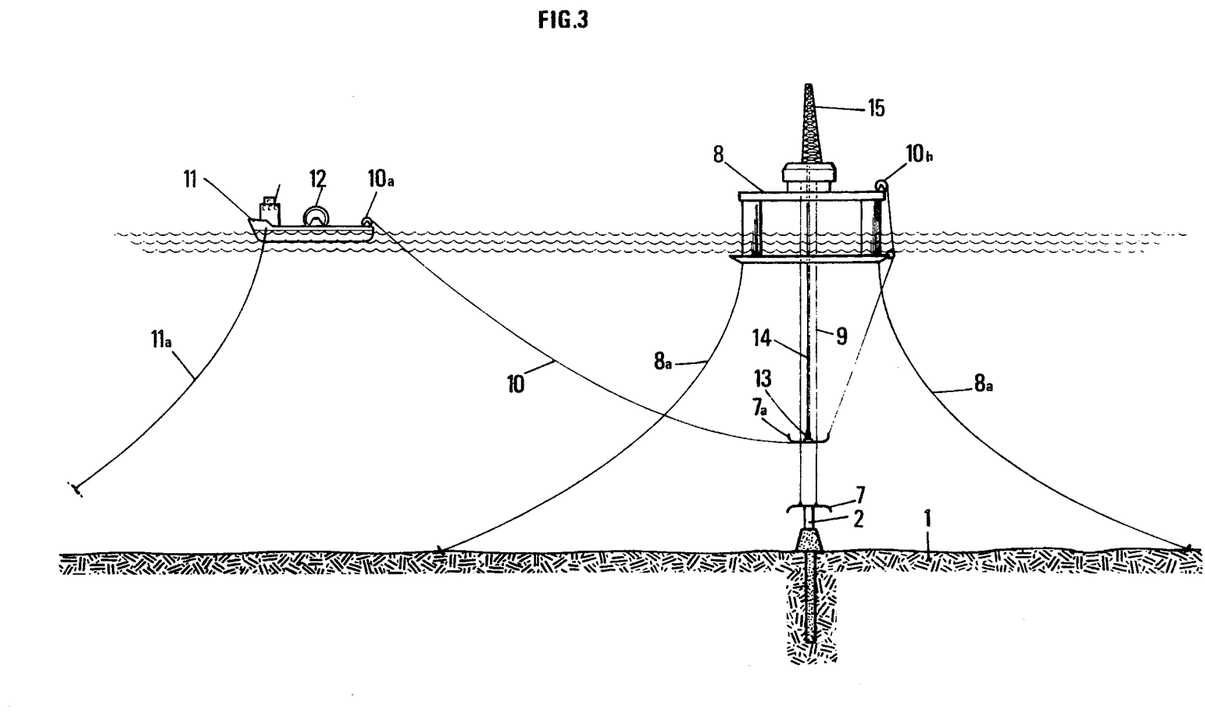

The flexible pipe or pipes to be laid are stored on winch 12 carried by the laying barge 11.

It will be, for example, possible to lower element 7a by detachably securing it through any suitable 13 to the lower end of a drill column 14 which is supported from platform 8 by a derrick 15 and lowered along guide cables 9. The element 7a is locked on template 7.

Figure 4:
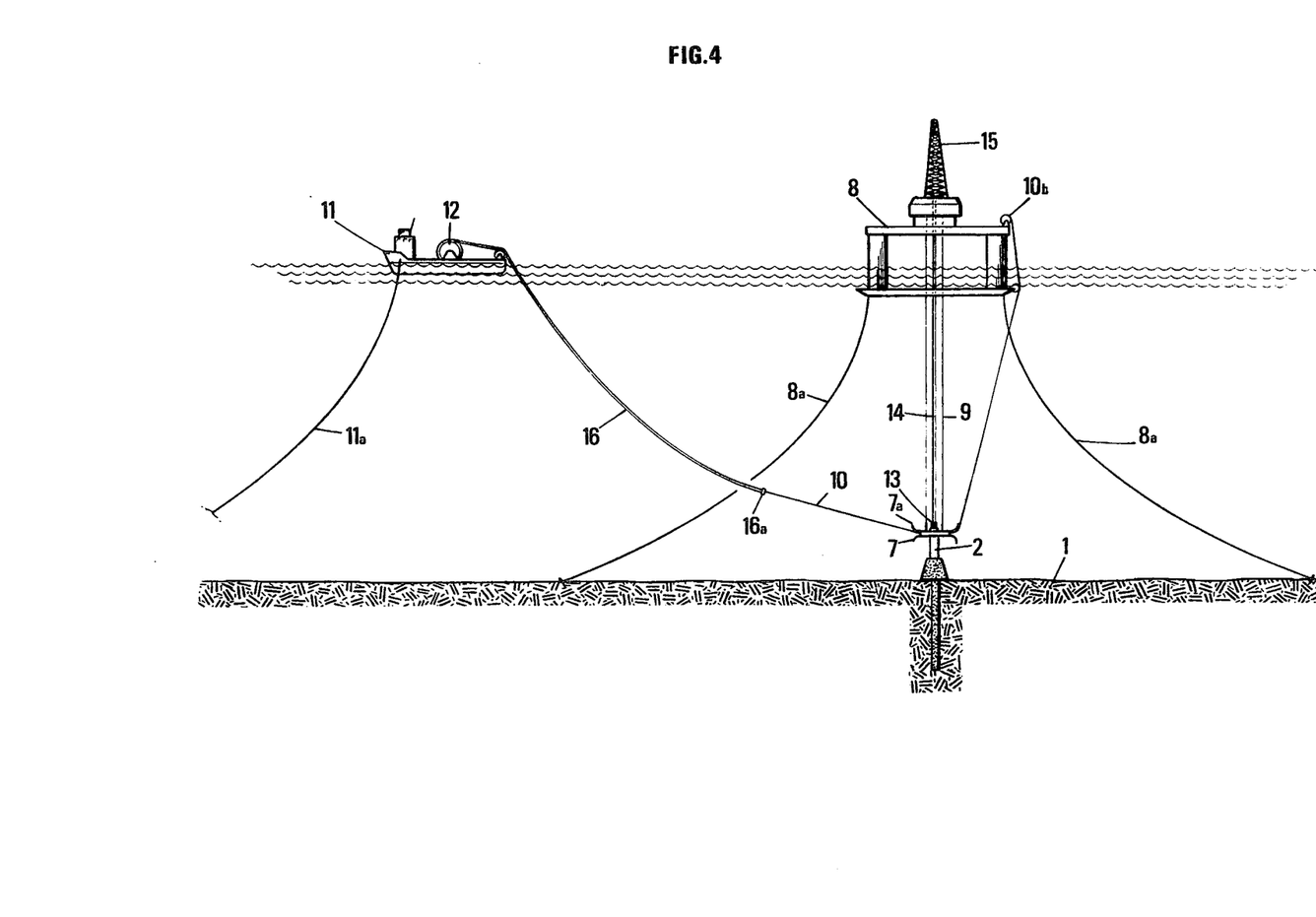
Figure 5:
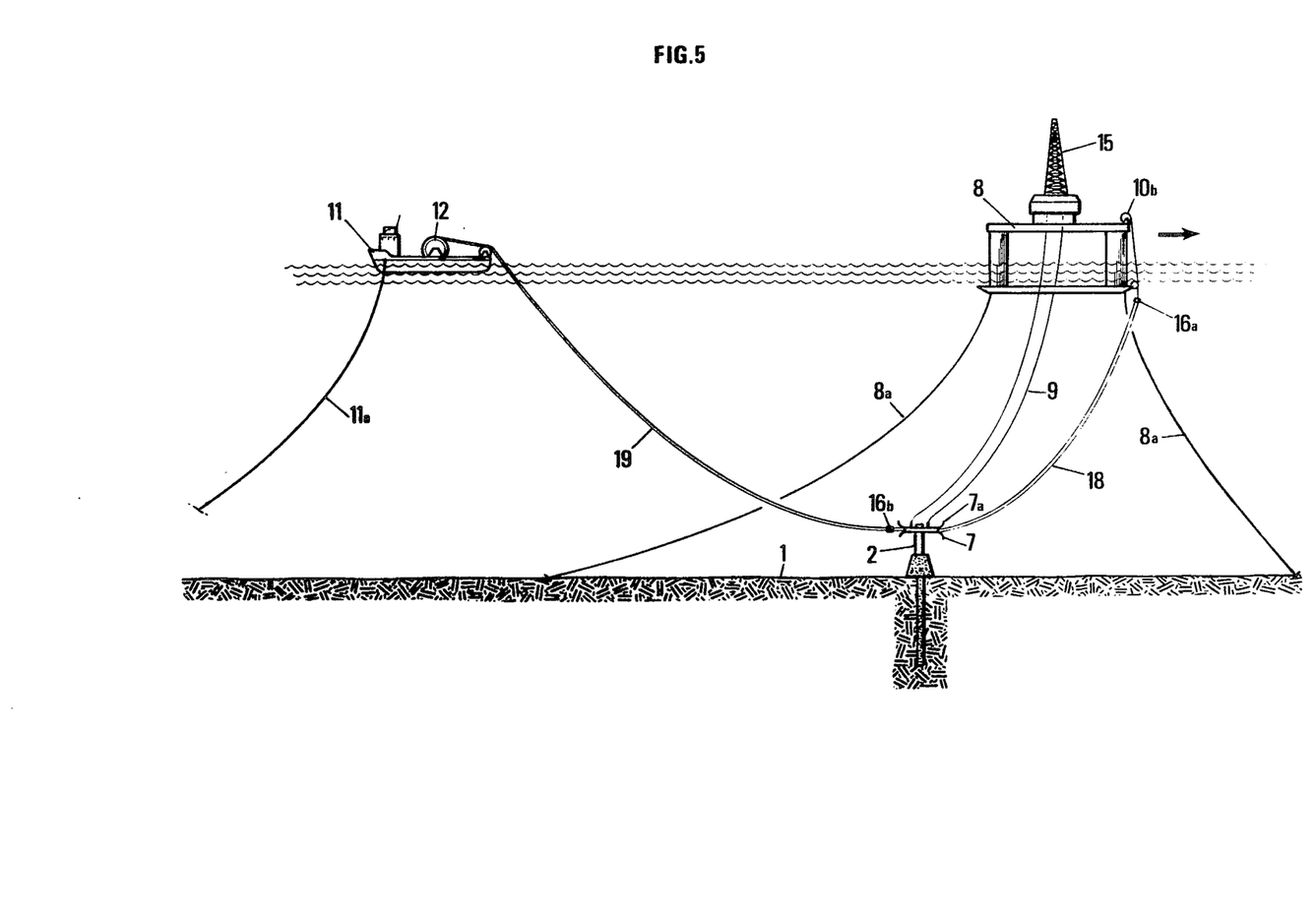

The end 10a of handling cable 10 is connected to at least one flexible pipe 16 to be laid, by securing this cable to the mouthpiece 16a of the pipe and, while keeping substantially stationary the laying barge 11, for example by means of mooring lines 11a (or by using a dynamic positioning equipment), handling cable 10 is pulled from the production platform 8 so as to unreel flexible pipe 16 (FIG. 4), this pipe passing between template 7 and element 7a before connecting mouthpiece 16a of the pipe to platform 8 (FIG. 5).

Mouthpiece 16a of the flexible pipe passes between template 7 and element 7a which engages this template, and platform 8 is optionally moved away from guide structure 2 (FIG. 5), after the drill column has been raised, in order to facilitate the passage of the pipe between template 7 and complementary element 7a.

A detachable connecting element 16b connects the upper part 18 of the flexible pipe (i.e. the riser) to the part 19 of this pipe which must be laid onto the water bottom (production flow line).

This connecting element 16b is so designed as to be housed between template 7 and complementary element 7a when mouthpiece 16a of the flexible pipe has reached platform 8. This arrangement facilitates a change of the portion of flexible pipe which constitutes riser 18 (as hereinunder described).

The pipe laying barge 11 is then moved away from platform 8 while further unreeling the flexible pipe by rotation of winch 12, and immersing this pipe progressively (FIG. 6) until the barge 11 comes close to the underwater structure, such as the underwater oil well (not shown), to which must be connected the end of flexible pipe 16 opposite to end 16a.

This connection may be effected by any known means and will therefore not be described here.

Element 7a can then be raised back and the connection through guide cables can be omitted between platform 8 and guide structure 2.

Figure 6:
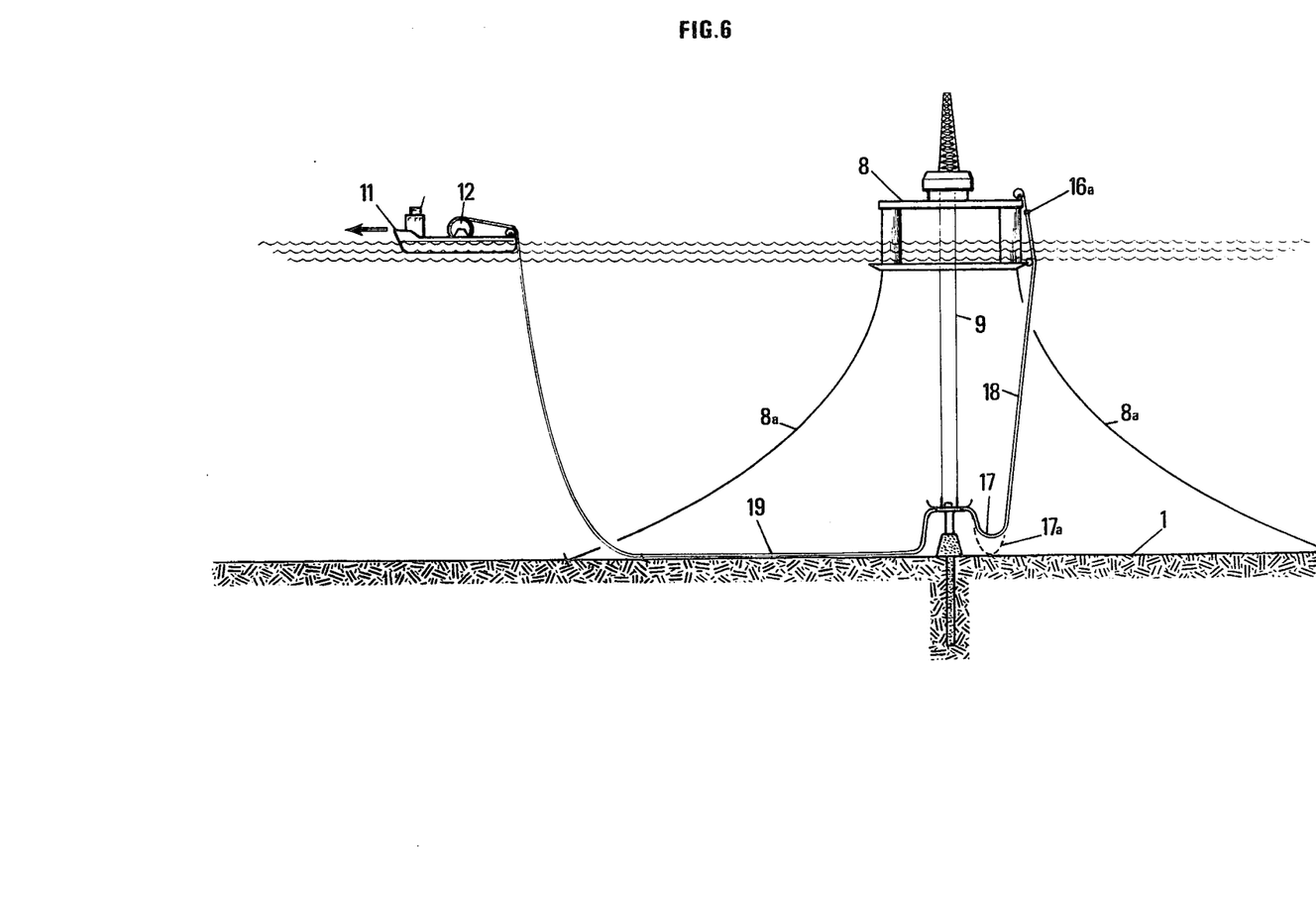

The production platform 8 being subjected to vertical displacements (alternating pounding movements due to heave and the effect of tides) the height of guide element 2 will advantageously be selected sufficient so that the catenary-shaped loop portion 17 of pipe 16, which connects template 7 to platform 8, does not reach the water bottom except during a short period of the working life of the device, or alternatively will only reach the bottom for the maximum foreseeable downward vertical displacement of platform 8 (this lowermost position being illustrated at 17a in FIG. 6).

By this way it is possible to avoid the risks of wear of portion 17 of the flexible pipe by rubbing on the water bottom, and the risk of having the loop portion 18 compressed, which might damage the flexible pipe.

Changing the riser or vertical portion 18 of the flexible pipe may be advantageously effected in the manner indicated hereinunder (optionally with the assistance of divers).

Platform 8 is positioned above guide structure 2 and the connection by guide cables 9 is established between platform 8 and guide structure 2.

An element 7b is then lowered along guide cables 9, this element guiding a handling cable 30 whose free end is placed below this element 7b, cable 30 being unreeled from a handling winch 31 whose location on platform 8 is remote from the upper end of riser 18. Element 7b is positioned on template 7 and connector 16b, at the lower end of the riser 18 to be changed, is disconnected.

Figure 7:
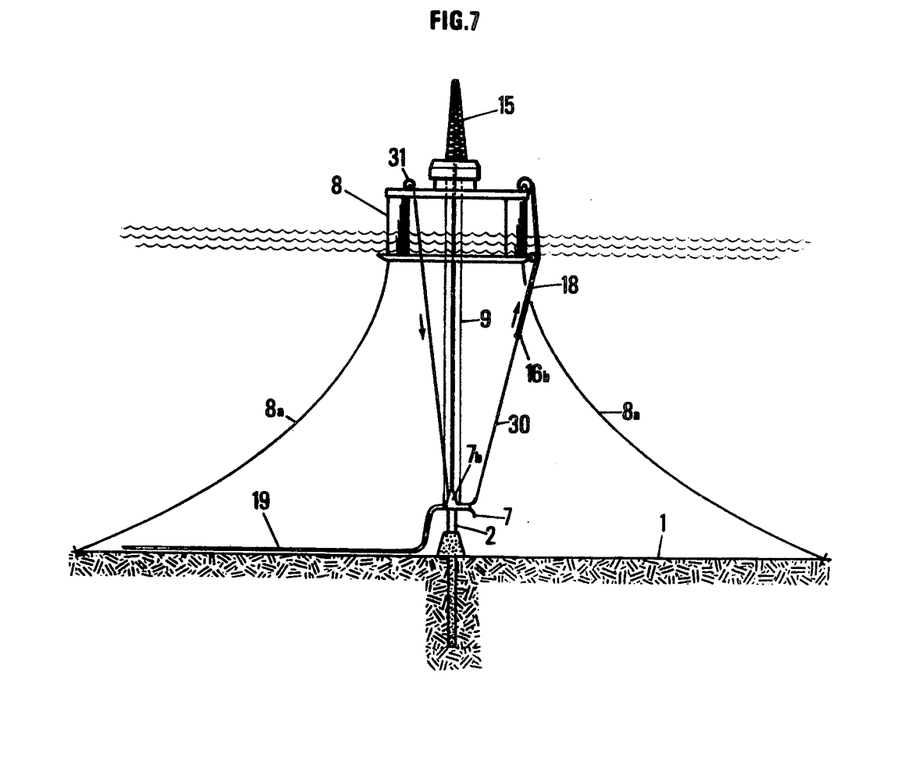
FIG. 7 illustrates the operation of changing a flexible pipe element connecting the surface installation to the guide-structure on the water bottom.

This riser is then raised to the water surface (FIG. 7) by applying a pull at its upper part, so that handling cable 30 is run between template 7 and complementary element 7b in the direction indicated by the arrows. By subsequently connecting to cable 30 a new riser 18 and thereafter rotating again the handling winch 31 in reverse direction so as to reel handling cable 30, it is possible to lower the new riser 18 until its free end can be connected at 16b to flow line 19.

Figure 8:
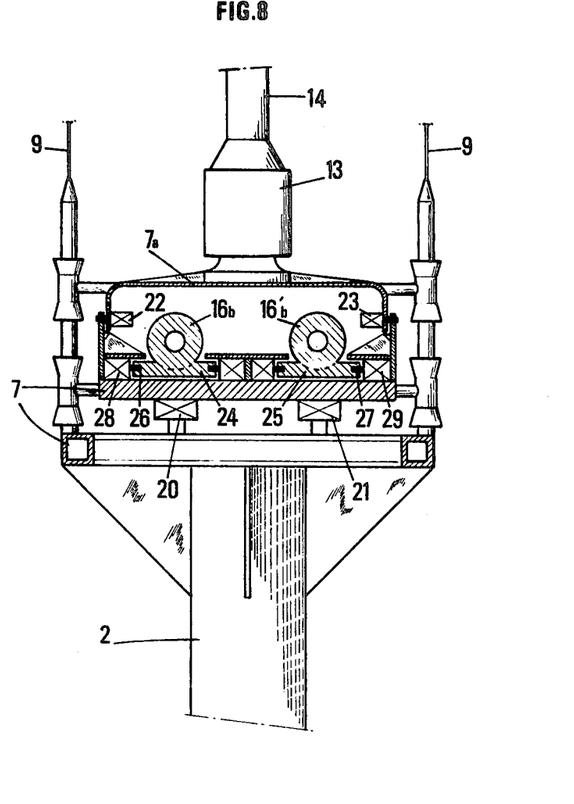
FIG. 8 shows an embodiment of the template at the upper part of the guide structure, in axial section by a plane at right angles to the plane of FIG. 6.

FIG. 8 diagrammatically illustrates on a larger scale an embodiment of the upper part of guide element 2, in axial section by a plane at right angles to the plane of FIG. 6.

In this embodiment template 7 is formed of two elements, the upper element being slidable along guide cables 9. This upper element can be secured to the lower element through connecting means 20 and 21.

The drill column 14 is provided at its lower end with a hydraulic connector 13 which may be of any suitable type and makes it possible to lower and raise the complementary elements 7a and 7b which engage the upper part of template 7 and can be secured thereto by connecting means 22 and 23. In the embodiment illustrated by FIG. 8, template 7 supports two flexible pipes 16 and 16' (shown in cross section).

Connecting means for connecting the part of pipes 16 and 16' respectively which bears on the water bottom to the vertical part of these pipes (or riser) are in this embodiment provided with pads 24 and 25 whereby they can be more easily secured to template 7. This connection can be effected by using connecting means 28 and 29 provided with connecting pins 26 and 27.

From the foregoing description, one skilled in the art can easily ascertain the essential characteristics of this invention, and without departing from the spirit and scope thereof, can make various changes and modifications of the invention to adapt it to various usages and conditions.

I claim:

1. A method for connecting a floating surface installation to an underwater installation through at least one flexible pipe, comprising the steps of:
    (a) placing onto the water bottom a rigid guide structure of a height smaller than the water depth and comprising at its upper part template support means for supporting said at least one flexible pipe while limiting the curvature thereof;
    (b) positioning said floating surface installation above said guide structure;
    (c) positioning a barge in the vicinity of said floating surface installation, said barge carrying at least one flow line connected at one end thereof to said at least one flexible pipe by means of a connecting element at one end of said at least one flexible pipe;
    (d) passing a handling line, connected to a mouthpiece element at the other end of said at least one flexible pipe, from said barge to said floating surface installation;
    (e) lowering said handling line by means of a complementary element, adapted to engage said template support means of said rigid guide structure, from said floating surface installation to said rigid guide structure and thereafter engaging said complementary element with said template support means in a spaced relationship, thereby providing adequate guiding space between said template support means and said complementary element for the passage of said handling line and said at least one flexible pipe;
    (f) exerting from said floating surface installation a pull on said handling line so that said at least one flexible pipe passes through said guiding space of said template support means, forming, by gravity, a loop portion of limited height between said support means and a substantially vertical portion of said at least one flexible pipe suspended from said floating surface installation; and
    (g) connecting said at least one flexible pipe to said surface installation and connecting said at least one flow line to said underwater installation.

2. A method according to claim 1, wherein said step (g) further comprises the steps of:
   (i) continuously extering said pull on said handling line until said mouthpiece element reaches said floating surface installation and said connecting element is positioned between said complementary element and said template support means, and;
   (ii) moving said barge away from said floating surface installation, while unreeling said at least one flow line and submerging it progressively until said barge reaches the vicinity of said underwater installation, and connecting the other end of said at least one flow line to said underwater installation.

3. A method according to claim 1, wherein said floating surface installation is connected to said rigid guide structure through guide cables for lowering said complementary element, adapted to engage said template support means, from said floating surface installation to said rigid guide structure.

4. A method according to claim 3, wherein said complementary element adapted to engage said template support means is lowered by detachably securing said element to the lower end of a drill column supported by said floating surface installation, said drill column being lowered along said guide cables.

5. A device for operatively connecting, for conveyance of a fluid through at least two flexible pipe sections including a flow line section and a riser section, a floating surface installation to an underwater installation, comprising a rigid guide structure having a stationary location on the water bottom, said rigid guide structure comprising at its upper part a template support means for coupling means for said at least two flexible pipe sections, said template support means supporting said at least two flexible pipe sections in the vicinity of the lower end of said riser section in such a manner so that said riser section forms by gravity one loop portion between said template support means and said water bottom, said template support means being located sufficiently above said water bottom so that said one loop portion formed by said flexible pipe riser section reaches said water bottom only for very high amplitudes of a vertical displacement of said floating surface installation.

6. A device according to claim 5, wherein said rigid guide structure is located substantially directly below said floating surface installation.

7. A device according to claim 5, wherein the two opposing edges of said template support means on which rest said at least two flexible pipe sections have a curved shape with a radius of curvature at least equal to the minimum radius of curvature of said at least two flexible pipe sections.

8. A device according to claim 5, wherein said template support means is adapted to receive a complementary element thereby delimiting a guide space through which said at least two flexible pipe sections can slide.

9. A device according to claim 8, wherein two opposing edges of said complementary element have a curved shape with a radius of curvature at least equal to the minimum bending radius of said at least two flexible pipe sections.

10. A device according to claim 8, wherein said complementary element is slidable along guide cables connecting said floating surface installation with the top of said rigid guide structure.

11. A device according to claim 5 wherein:
   (a) two opposing edges of said template support means on which rest said at least two flexible pipe sections, have a curved shape with a radius of curvature at least equal to the minimum radius of curvature of said one loop portion formed by said riser pipe section;
   (b) said template support means is adapted to receive a complementary element, thereby delimiting a guiding space through which said at least two flexible pipe sections can slide;
   (c) two opposing edges of said complementary element have a curved shape with a radius of curvature at least equal to the minimum bending radius of said riser pipe section;
   (d) said complementary element is slidable along guide cables connecting said floating surface installation with the top of said rigid guide structure; and
   (e) said template support means is located sufficiently above said water bottom so that said one loop portion formed by said flexible pipe riser section reaches said water bottom only for very high amplitudes of a vertical displacement of said floating surface installation.

12. A device according to claim 5 wherein at least a part of said template support means has a curved shape with a radius of curvature at least equal to the minimum radius of curvature of said riser pipe section.

13. In a system for offshore recovery of hydrocarbon, comprising an underwater production installation, connected to one end of at least one production flow line, the other end of said at least one production flow line being connected to at least one flexible riser pipe suspended from a surface installation, the improvement comprising a rigid guide structure having a stationary position on the water bottom and comprising at its upper end a template support means supporting the lower end of said at least one flexible riser pipe in such a manner so that said at least one flexible riser pipe forms by gravity a free loop portion between said template support means and said water bottom, said template support means being located sufficiently above said water bottom so that said one loop portion formed by said flexible pipe riser section reaches said water bottom only for very high amplitudes of a vertical displacement of said floating surface installation.

14. A system for offshore recovery of hydrocarbons according to claim 13, wherein said at least one production flow line is detachably connected to said at least one flexible riser pipe substantially at the level of said template support means, to facilitate an exchange of said at least one flexible riser pipe.

15. A method of exchanging at least one flexible riser pipe connecting a floating surface installation to an underwater rigid guide structure provided with template support means, said flexible riser pipe being originally connected at one end thereof to at least one underwater flow line by means of a connecting element supported by said underwater rigid guide structure, the other end of said flexible riser pipe being connected by means of a mouthpiece element to said floating surface installation, said method comprising the steps of:
   (a) lowering from said floating surface installation handling cable means by means of a complementary element;
   (b) disengaging said connecting element from said at least one flow line;
   (c) attaching said one end of said flexible riser pipe to said handling cable means;

(d) exerting a pull on said flexible riser pipe to elevate it to said floating surface installation;
(e) disconnecting said riser pipe from said handling cable means;
(f) attaching a new riser pipe section to said handling cable means;
(g) exerting a pull on said handling cable means to lower said new flexible riser pipe until its lower end reaches said template support means, and
(h) connecting said lower end of said new flexible riser pipe to said at least one underwater flow line.

16. A device for operatively connecting, for conveyance of a fluid through at least two flexible pipe sections including a flow line section and a riser section, a floating surface installation to an underwater installation, comprising a rigid guide structure having a stationary location on the water bottom, said rigid guide structure comprising at its upper part a template support means containing coupling means, said template support means supporting said riser pipe section in the vicinity of the first end thereof in such a manner so that said at least one flexible riser pipe section forms by gravity one loop portion between said template support means and said water bottom, said template support means being located sufficiently above said water bottom so that said one loop portion formed by said flexible pipe riser section reaches said water bottom only for very high amplitudes of a vertical displacement of said floating surface installation.

17. A device according to claim 16, wherein two opposing edges of said template support means have a curved shape with a radius of curvature at least equal to the minimum radius of curvature of said one loop portion formed by said riser pipe section.

18. A device according to claim 16, wherein said coupling means is adapted to receive a complementary element, thereby delimiting a passageway through which said riser pipe section can slide.

* * * * *